United States Patent [19]

Patel

[11] Patent Number: 5,712,228
[45] Date of Patent: Jan. 27, 1998

[54] SILICONE BASED FLUIDS FOR DRILLING APPLICATIONS

[75] Inventor: Arvind D. Patel, Houston, Tex.

[73] Assignee: M-I Drilling Fluids L.L.C., Houston, Tex.

[21] Appl. No.: 531,708

[22] Filed: Sep. 21, 1995

[51] Int. Cl.⁶ .................................. C09K 7/02; C09K 7/00
[52] U.S. Cl. ........................... 507/233; 507/127; 507/940
[58] Field of Search ............................... 507/127, 233, 507/140, 940

[56] References Cited

U.S. PATENT DOCUMENTS

| 2,726,207 | 12/1955 | Healey | 507/127 |
| 2,871,189 | 1/1959 | Brukner | 507/127 |
| 2,939,839 | 6/1960 | Brukner | 507/127 |
| 3,528,914 | 9/1970 | Darley | 507/127 |
| 3,716,486 | 2/1973 | Perricone | 507/127 |
| 4,381,241 | 4/1983 | Romenesko et al. | 507/127 |
| 4,421,656 | 12/1983 | Donatelli et al. | 507/140 |
| 5,401,719 | 3/1995 | DeBeer | 507/140 |

*Primary Examiner*—Philip Tucker
*Attorney, Agent, or Firm*—Arnold, White and Durkee

[57] ABSTRACT

An essentially non-polluting, substantially non-toxic drilling fluid composition has been discovered that is particularly useful as a lubricant or spotting fluid in drilling oil and gas wells. The fluid comprises silicone which may be is mixed with an emulsifier for application in the water base mud system.

14 Claims, No Drawings

SILICONE BASED FLUIDS FOR DRILLING APPLICATIONS

BACKGROUND OF THE INVENTION

This invention relates to improved drilling fluids for use in the drilling of oil, gas, or geothermal subterranean wells, and particularly to drilling fluids for downhole drilling applications, such as lubricating drill bits and pipes and preventing sticking of downhole tools or dislodging a tool already lodged in the formation. The invention is also particularly concerned with non-polluting and substantially non-toxic drilling fluids for such downhole drilling applications.

In drilling operations wherein a stem of rotary drill pipe penetrates a permeable subterranean formation, and drilling fluid is circulated through the wellbore, a filter cake of solids from the drilling fluid builds up on the walls of the wellbore in the subterranean formation. A pressure differential between the hydrostatic pressure of the drilling fluid and the pressure in the subterranean formation may develop and force the drill pipe against the filter cake. The drill pipe and/or the drill bit may stick or become lodged in the formation, hindering or disrupting the drilling.

Such sticking problems are common, and numerous fluids have been used by the oil and gas industry in an effort to prevent sticking or to unstick or dislodge a lodged bit or pipe. Coating the drill stem with fluids has been tried but spotting fluids are usually considered more effective, for example, see U.S. Pat. No. 3,217,802. Typically, these spotting fluids have had vegetable oil, mineral oil, or diesel oil as a base oil combined with emulsifiers and thinners. However, diesel and mineral oils are known to be potentially hazardous to the environment, and particularly to marine life, and hence are subject to stringent government regulations. Refined mineral oils pose less environmental concern than diesel oil, but still toxicity concerns remain. Vegetable oils are relatively non-toxic, but have not been as effective as desired in unsticking drill pipe or drill bits.

There continues to be a need for more drilling fluids useful in downhole drilling applications, particularly for lubricating and spotting fluid applications, that are also substantially non-toxic and without environmental incompatibility problems.

SUMMARY OF THE INVENTION

The present invention relates to an essentially non-polluting, substantially non-toxic drilling fluid comprising silicone for downhole drilling applications, and particularly for use as a lubricant or as a spotting fluid, in a water base mud system. Examples of silicones believed to be useful in the practice of this invention include dimethylsiloxane polymers, also called dimethyl silicone fluids, having low viscosity (such as about 2.0 centistokes at 25° Centigrade) to medium viscosity (such as about 1,000 centistokes at 25° Centigrade). These dimethylsiloxanes for use in this invention may be cyclic or straight chain and have the general formula —$((CH_3)_2SiO_2)_x$— where x is a number in the range of about 2 to several hundred. The silicone is combined with an emulsifier to serve as a downhole lubricant or spotting fluid.

In the practice of this invention, silicone is introduced into a wellbore, with an emulsifier alone or combined with a water base mud system. After introduction, the silicone fluid and emulsifier mixture is circulated in the wellbore with the water base mud system. Alternatively, the silicone fluid and emulsifier mixture is administered directly to the site of need, as for example, the location where the downhole tool is lodged or tending to stick in the formation during drilling.

DESCRIPTION OF THE PREFERRED EMBODIMENT

The present invention is based on the discovery that silicone is highly effective as the base for a drilling fluid lubricant or spotting fluid, with a low order of toxicity. In the preferred embodiment, the silicone based drilling fluid of the present invention (hereinafter also referred to as silicone-based fluid) comprises silicone in a liquid state to be introduced into a subterranean wellbore to lubricate the drill pipe and drill bit or to prevent sticking of a downhole tool or to unstick an already lodged downhole tool.

The silicone based drilling fluid is particularly suited to use with a water base mud system, and may be incorporated in that system to constitute the drilling fluid for use in drilling the well. In its use as a lubricant for the drill bit or drill pipe or other downhole tools, silicone of the present invention is mixed or combined with an emulsifier and may be further combined with other additives to provide desired characteristics. In its use as a spotting fluid downhole to unstick or dislodge a downhole tool, such as a drill bit or drill pipe, lodged in the formation, silicone of the present invention is mixed or combined with an emulsifier and may be further combined with other additives, such as oils, particularly mineral oils or polyalphaolefins, or combinations of these, for desired characteristics. For either use, the amount of emulsifier in the mixture will preferably not exceed about 20% by volume of the mixture and the amount of silicone will preferably comprise at least about 80% of the mixture. However, substantial variations from this preferred ratio is possible and within the scope of this invention.

An advantage of this invention is that the silicone fluid of this invention is minimally or substantially non-toxic, particularly to marine life. Hence, additives to the fluid should preferably be non-toxic or added in non-toxic amounts so as to not render the drilling fluid, as a whole, toxic.

Another advantage of this invention is that after use as a lubricant or spotting fluid, the silicone-based drilling fluid of this invention may be combined with the water base mud system being used for drilling the well. Neither removal of the silicone based drilling fluid or separate disposal of it from the water base mud system is necessary.

A water base mud system, such as that employed in the use or practice of this invention, typically includes, in addition to a base fluid of water or brine, various colloidal substances (such as clays), densifying components (such as barite), and/or special purpose additives (such as viscosity modifiers, corrosion inhibitors, fluid loss control agents, thinners, and emulsifiers), to enable the mud to meet the needs of particular drilling operations. These additives increase the density or viscosity of the mud, prevent drilling mud loss from the borehole into penetrated formations, stabilize mud properties, and help keep drill cuttings and debris suspended in the mud.

Preferred silicones for use in this invention include dimethylsiloxane polymers, also called dimethyl silicone fluids, having the general formula, (—$(CH_3)_2$—$SiO_2)_x$, cyclic or straight chain, where x is a number in the range of about 2 to several hundred. The viscosity of such dimethyl silicones ranges from about 2.0 centistokes (cst), considered a low viscosity, to about 1,000 (cst), considered a medium viscosity, at 25° Centigrade.

Emulsifiers are chemical compounds which have both oleophilic and hydrophilic parts. Examples of emulsifiers suitable for use in this invention include fatty acids, soaps of fatty acids, and fatty acid derivatives, including amidoamines, polyamides, polyamines, esters (such as sorbitan monoleate polyethoxylate and sorbitan dioleate polyethoxylate), imidazolines, alcohols, polyalkene oxide modified dimethyloiloxanes, and combinations or blends of these. As the term "emulsifiers" is used herein, it is synonymous or interchangeable with the term "surfactants."

The drilling fluids of the present invention can be prepared in a manner typically used to prepare drilling fluids. In one representative procedure for producing a drilling fluid, the desired quantity of silicone and an emulsifier are mixed together, then other components, if any, are added sequentially with continuous mixing.

In practicing the invention, silicone or the mixture of silicone and emulsifier is introduced into the wellbore, alone or combined or mixed with water base mud. The silicone-based fluid may then be circulated with the water base mud in the well or may be delivered directly to the site of need, for example, the location of sticking pipe or lodged drill bit. Circulation of the fluid is generally preferred for use as a lubricant, and direct delivery of the fluid is generally preferred for use as a spotting fluid. With delivery of spotting fluid to the site of need, the spotting fluid may replace the water base mud in the vicinity of the site. After the stuck tool has become dislodged, the spotting fluid may remain in the well for circulation as a lubricant in the water base mud.

Further with respect to using the silicone-based fluids of this invention as a spotting fluid, we have found that when a drill stem pipe or other downhole tool is stuck against a cake of water-wet well fluid solids on a wall of the wellbore in a permeable formation, and such sticking is believed to be due to differential hydrostatic pressure across the drill stem, the pipe or tool may be released by substantially filling the wellbore outside the drill stem in the permeable formation with silicone-based fluid of this invention. The silicone-based fluid is held in the wellbore in contact with the cake for a period of time sufficient for the fluid to cause the cake to dehydrate or shrink and crack and for the fluid to penetrate the cake of water-wet well fluid solids. Such flow of the fluid from the wellbore into the cake through the resulting cracks should at least partially relieve or reduce the differential pressure across the drill stem piping or other downhole tool.

The silicone-based fluid may be held in contact with the cake for an additional time to further shrink, crack and penetrate the cake so that the silicone-based fluid penetrates entirely through the cake and wets the surface of the permeable formation. Wetting the surface of the permeable formation with the silicone-based fluid lowers the force of adhesion between the cake of water-wet solids and the face of the permeable formation so that the cake in contact with the drill stem has a strong tendency to break away from the surface of the formation while it may continue to adhere to the drill stem.

Further holding of the silicone-based fluid in contact with the cake of water-wet solids will result in the fluid penetrating the permeable formation and establishing a differential pressure gradient from the bore of the well outside the drill stem through the cake and into the formation, thereby further decreasing the differential pressure which forces the drill stem against the cake. In establishing this pressure gradient from the wellbore through the cake into the formation, penetration of the silicone-based fluid through the cracked cake is not limited to penetration through that portion of the cake against which the drill stem is stuck. Fluid penetrating through the cake at each side of this portion may penetrate freely into the formation and diffuse therein to a location behind the drill stem, setting up a pressure gradient from the bore of the well, through the cake and into the formation. This pressure gradient substantially reduces the force with which the drill stem is held against the cake by hydrostatic pressure in the wellbore. Dehydration and cracking of the cake, accompanied by penetration of silicone-based fluid into the cake, also results in a change in friction between the cake and the drill stem. As a result of some or all of these forces, the drill stem becomes loosened from its lodged or stuck position against the wall of the borehole.

After the silicone-based fluid has been spotted in the permeable formation, and preferably after such fluid has been held in the wellbore for a length of time sufficient for the fluid to cause the cake to dehydrate or shrink and crack and for the fluid to penetrate the cake, the pipe may be worked by conventional mechanical methods, such as jarring or vibrating, to help break the pipe away from the wall of the wellbore.

The time required for the silicone-based time to shrink, crack and penetrate the cake cannot be estimated accurately, but frequently may be from several minutes to several hours, depending on the particular Well conditions, the composition of the cake, its permeability, and other factors.

Any suitable method for placing the silicone-based fluid in the wellbore in the permeable formation may be used. One preferred method for filling the wellbore in the permeable formation with the silicone-based fluid of the present invention is to introduce a slug of such fluid into a well fluid circulating system and pump the slug of fluid followed by the mud used in falling the well down the drill stem and up through the wellbore outside the drill stem to the desired location and stopping circulation when the fluid is in place. This manner of spotting fluids at particular locations in a wellbore is well known in the art.

The following examples illustrate the non-toxicity and performance characteristics of the silicone-based fluids of this invention. Dimethyl silicones acquired from the Union Carbide Company, and identified by letter and number trade names, A-50 and L-45, below, were used. These silicones are further described in Union Carbide's booklet entitled, "Silicone Fluids, Emulsions and Antifoams" (1991).

EXAMPLE 1

Four silicone fluid compositions were prepared for testing for use as lubricants with water base drilling fluid. These compositions had the following formulations:

| | Formulations | |
|---|---|---|
| Composition | Chemicals | % by weight |
| 1. | Silicone Fluid L-45 (10 cst) | 100 |
| 2. | Silicone Fluid L-45 (10 cst) | 90 |
| | Acintol ™ FA-1 (tall oil fatty acid available from Arizona Chemical Company) | 10 |
| 3. | Silicone Fluid L-45 (10 cst) | 90 |
| | Silwet ® 77 (surfactant available from Union Carbide) | 10 |
| 4. | Silicone Fluid A-50 (2.5 cst) | 90 |
| | Acintol ™ FA-1 (tall oil fatty acid from Arizona Chemical Company) | 10 |

Lubricity was measured on an LEM lubricity meter in 22 ppb bentonite gel slurry in water on Berea sandstone. The silicone fluid compositions were used at 1% and 2% levels by volume of gel slurry. The following are the test results for these silicone-based lubricants:

| Test Results | | |
|---|---|---|
| Composition Tested: | cf sandstone | % change in lubricity |
| 22 ppb gel slurry | 0.62 | — |
| 1% Composition | 0.55 | 10.6 |
| 22 ppb gel slurry | 0.62 | — |
| 1% Composition No. 2 | 0.13 | 79 |
| 2% Composition No. 2 | 0.128 | 79.4 |
| 22 ppb gel slurry | 0.64 | — |
| 1% Composition No. 3 | 0.24 | 62.5 |
| 2% Composition No. 3 | 0.20 | 68.6 |
| 22 ppb gel slurry | 0.63 | — |
| 1% Composition No. 4 | 0.22 | 65.1 |
| 2% Composition No. 4 | 0.18 | 70.8 |

The above results indicate that silicone fluid compositions, particularly when combined with surfactants, give excellent lubricity properties to water for drilling fluid gel slurry. The tested silicone fluid compositions of this invention reduced the coefficient of friction by up to 80%.

EXAMPLE 2

Five silicone fluid compositions were prepared for testing for spotting fluid applications. These compositions had the following formulations:

| Formulations | | |
|---|---|---|
| Composition | Chemicals | % by weight |
| 5. | Silicone Fluid L-45 (10 cst) | 95 |
|  | Alkaterge-T ™ (available from Angus Chemicals Company) | 5 |
| 6. | Silicone Fluid L-45 (10 cst) | 95 |
|  | Acintol ™ FA-1 (tall oil fatty acid available from Arizona Chemical Company) | 5 |
| 7. | Silicone Fluid A-50 (2.5 cst) | 95 |
|  | Acintol ™ FA-1 (tall oil fatty acid available from Arizona Chemical Company) | 5 |
| 8. | Silicone Fluid L-45 (10 cst) | 95 |
|  | Silwet ® 7622 (surfactant available from Union Carbide) | 5 |
| 9. | Silicone Fluid A-50 | 95 |
|  | Silwet ® 7622 (surfactant available from Union Carbide) | 5 |

Testing Procedure

Water base mud was prepared for use in the testing as follows: 0.7 grams tetrasodiumpyrophosphate (TSPP) was added to 2114 ml of warm water in a gallon plastic jug and stirred for 5 minutes at 3500 RPM. To this, 63.7 grams of bentonite gel was added and stirred for 5 minutes. To this, 130.2 grams of X-act clay was added and stirred for 5 minutes. To this, 112.7 grams of salt gel, 5.25 grams of quebracho, and 4.0 ml of 50% NaOH solution was added, and stirred for 10 minutes at 4000–6000 RPM. To this, 840 grams of barite was added and the entire composition was stirred for 30 minutes at 8000 RPM. This base mud had the following properties: Apparent Viscosity 18; API Fluid Loss 20 cc; and pH 9.6.

The filter cake cracking efficiency by the silicone fluid compositions was then determined using the following procedure: The water base mud prepared as above was stirred for 5–10 minutes. Fluid loss tests were then conducted for 30 minutes in API cells and the fluid loss observed. About 20 ml was lost. The API cells were then emptied by pouring from the hole in the top of each cell so as to discard the mud and keep the filter cake intact. 50–60 ml of the silicone fluid composition (test sample) of spotting fluid was added into the cell from the hole in the top. The hole was then closed. API fluid loss tests were conducted at 100 psi for 30 minutes. The fluid losses were recorded and any residual spotting fluid was removed by pouring from the opening in the top of the cell. Each cell was then carefully opened and the appearance of the filter cakes observed. The cracking index (cracking efficiency) was calculated by counting the number of cracks that intersected a circular 1 cm square grid and dividing this number by the unintersected grids.

A cracking index of 1.0 means a high level of cracking, indicating the spotting fluid is likely to be highly effective. A cracking index of 0.0 means no cracking, indicating the spotting fluid is likely not to be effective. Greater than 50 ml fluid loss means effectively a total loss of fluid, indicating the spotting fluid is likely to be highly effective. The lower the fluid loss, the less effective the spotting fluid is likely to be.

The following are the test results for these silicone fluid based spotting fluid formulations.

| Test Results | | |
|---|---|---|
| Composition | Cracking Index | API Fluid Loss |
| 5 | 1.0 (high cracking) | >50 ml total |
| 6 | 1.0 | >50 ml total |
| 7 | 1.0 | >50 ml total |
| 8 | 1.0 | >50 ml total |
| 9 | 1.0 | >50 ml total |
| Silicone A-50 | 0.0 (no cracking) | >50 ml total |
| Silicone L-45 (10 cst) | 0.0 | >50 ml total |
| Diesel oil | 0.0 | 7.4 ml oil 6.0 ml H$_2$O |

The above data indicates that the silicone based spotting fluid examples of this invention had a cracking index of 1.0 and/or total fluid losses. This data indicates the fluids are excellent for spotting fluid applications. In contrast, fluid loss with diesel oil was significantly less than with the silicone-based fluids of this invention. The fluids of this invention are hence more effective as spotting fluids than diesel oil and have the added benefits of being substantially non-toxic and compatible with the environment.

EXAMPLE 3

To determine the toxicity of the silicone based drilling fluids of this invention, tests were conducted on three drilling fluid samples following the standard U.S. Environmental Protection Agency protocol set forth in Appendix 3 of "Effluent Limitation Guidelines and New Source Performance Standards: Drilling Fluid Toxicity Test," *Federal*

*Register* Vol. 50, No. 165, 34631–34636. The tests comprised 96-hour range-finder bioassays conducted on a suspended particulate phase ("SPP") of each sample using *Mysidopsis bahia*, also called mysid shrimp. In these tests, SPP is the unfiltered supernatant extracted from a 1:9 mixture of the drilling fluid and seawater which was allowed to settle for one hour. $LC_{50}$ is the concentration or the quantity of a toxic substance in the surrounding water that produces 50% mortality in the test species. The greater the 96-hour $LC_{50}$ value, the lower the toxicity of the drilling fluid sample being tested. The results are presented below.

Bioassay Results—Sample 1 (AP SF-200 10% in Generic Mud #7)

AP SF-200 is the silicone fluid L-45 (200 cst) obtained from Union Carbide.

A 96-hour $LC_{50}$ of greater than 500,000 ppm was determined for drilling fluid sample 1. The highest concentration (500,000 ppm) of SPP tested had an observed 80% survival. The negative control (20 mycids in seawater) showed 100% survivability.

Bioassay Results—Sample 2 (2% AP-SF-A-50 in Generic Mud #7)

AP-SF-A-50 is the silicone fluid A-50 obtained from Union Carbide.

A 96-hour LC-50 of greater than 1,000,000 ppm was determined for drilling fluid sample 2. The negative control (60 mycids in straight seawater) showed 97% survivability. A 95% confidence interval could not be established for this data set.

Bioassay Results—Sample 3 (AP-L45-10 SF 10% in Generic Mud #7)

AP-L45-10 SF is the silicone fluid L-45 (10 cst) obtained from Union Carbide.

A 96-hour $LC_{50}$ of greater than 500,000 was determined for drilling fluid sample 3. The highest concentration (500,000 ppm) of SPP tested had an observed 100% survival. The negative control (20 mycids in seawater) showed 100% survivability.

Test Conclusions

The results of these bioassays indicate that the 96-hour $LC_{50}$ for each of these laboratory-prepared drilling fluid samples was greater (i.e., less toxic) than the 30,000 ppm toxicity limitation set by the Gulf of Mexico NPDES permit. That is, the drilling fluid samples of this invention show substantial non-toxicity.

Although there has been described above a substantially non-toxic silicone-based drilling fluid in accordance with the present invention for purposes of illustrating the manner in which the invention can be used to advantage, it is to be understood that the invention is not limited thereto. Accordingly, any and all modifications and variations which occur to those skilled in the art are to be considered to be within the scope and spirit of the invention as defined in the following claims.

What is claimed is:

1. In drilling a borehole in a subterranean formation using water base mud, wherein a drill string and drill bit are rotated in said formation, and the drill string or drill bit has become stuck, a process of unsticking the drill string or drill bit, comprising:

combining silicone with an emulsifier;
   introducing said combination into the borehole which contains water base mud;
   circulating in said borehole the water base mud and the combination of silicone and emulsifier in a volume sufficient to lubricate the drill pipe or drill bit so that the drill pipe or drill bit becomes unstuck.

2. The process of claim 1 wherein said silicone and emulsifier combination is further combined with water base mud for introduction into the borehole.

3. The process of claim 1 wherein said silicone has a viscosity in the range of about 2.0 to about 1000 centistoke viscosity at about 25° C.

4. The process of claim 1 wherein the emulsifier in said combination of silicone and emulsifier comprises less than about twenty percent by volume of the combination.

5. The process of claim 1 wherein said silicone is a dimethylsiloxane polymer.

6. The process of claim 1 wherein said combination of silicone and emulsifier is substantially non-toxic to marine life as determined with *Mysidopsis bahia*.

7. A process for unsticking a downhole tool when using a water base mud system to drill a borehole in a subterranean formation, wherein the downhole tool has become stuck against the formation, comprising:

locating a point downhole wherein the downhole tool has become stuck;
   introducing into said borehole a spotting fluid including silicone or a mixture comprising silicone and a surfactant, the spotting fluid being administered to the point where the downhole tool is stuck in a volume sufficient to replace the water base mud surrounding the point where the downhole tool is stuck thus unsticking the tool.

8. The process of claim 7, wherein the silicone is a dimethylsiloxane polymer having a viscosity in the range of about 2 to about 1000 centistokes at 25° C.

9. The process of claim 7 wherein said spotting fluid functions as a lubricant upon mixing of the spotting fluid and the water base mud during drilling after said downhole tool has become unstuck.

10. The process of claim 7 wherein said downhole tool is a drill bit.

11. The process of claim 7 wherein said downhole tool is a drill pipe.

12. The process of claim 6 wherein the mixture of the spotting fluid and the water based drilling mud has a 96 hour $LC_{50}$ greater than 30,000 ppm.

13. The process of claim 9 wherein the mixture of the spotting fluid and water based drilling mud is substantially non-toxic to marine life as determined with *Mysidopsis bahia*.

14. The process of claim 13 wherein the mixture of the spotting fluid and water based drilling mud has a 96 hour $LC_{50}$ greater than 30,000 ppm.

* * * * *

UNITED STATES PATENT AND TRADEMARK OFFICE
CERTIFICATE OF CORRECTION

PATENT NO. : 5,712,228
DATED : January 27, 1998
INVENTOR(S) : Arvind D. Patel

It is certified that error appears in the above-identified patent and that said Letters Patent is hereby corrected as shown below:

Column 5, line 12 should read under the area labeled "Composition Tested" as follows:

1% Composition No. 1 and

Column 7, line 26 should read as follows:

A 96-hour $LC_{50}$ of greater than 1,000,000 ppm was

Signed and Sealed this

Ninth Day of June, 1998

*Attest:*

*Attesting Officer*

BRUCE LEHMAN
*Commissioner of Patents and Trademarks*